Sept. 16, 1969    D. G. LOUKES ET AL    3,467,512

METHOD AND APPARATUS FOR FLOAT GLASS DROSS ENTRAPMENT

Filed Aug. 1, 1966    2 Sheets-Sheet 2

United States Patent Office 3,467,512
Patented Sept. 16, 1969

3,467,512
METHOD AND APPARATUS FOR FLOAT GLASS DROSS ENTRAPMENT
David Gordon Loukes, Prescot, and Robin Arnold Merryweather, Rainford, England, assignors to Pilkington Brothers Limited, Liverpool, England, a corporation of Great Britain
Filed Aug. 1, 1966, Ser. No. 569,198
Claims priority, application Great Britain, Aug. 19, 1965, 35,668/65
Int. Cl. C03b *18/02*
U.S. Cl. 65—99                             6 Claims

ABSTRACT OF THE DISCLOSURE

Dross is removed from the exposed surface of a bath of molten metal in the float process for the manufacture of flat glass by using linear induction motors mounted above the metal surface to direct surface flow of the molten metal into dross-receiving areas.

---

Figure 1:
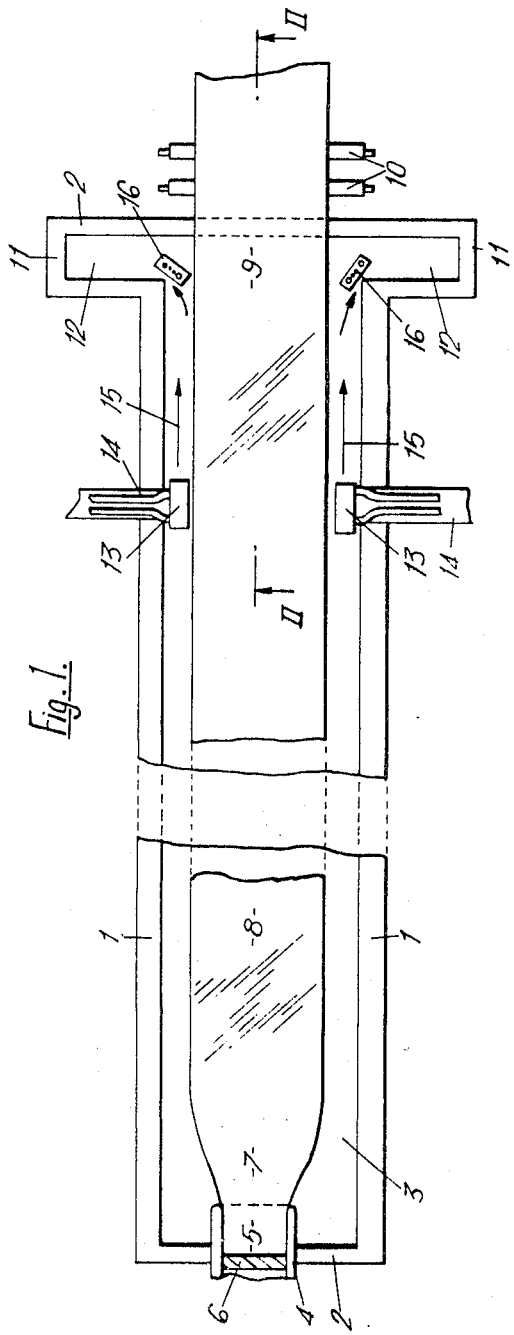

This invention relates to the manufacture of flat glass and more especially to methods and apparatus for the manufacture of flat glass during which glass in ribbon form is advanced along a bath of molten metal.

Preferably the bath of molten metal is a bath of molten tin or a molten tin alloy having a specific gravity greater than glass and is for example so constituted as to have all the characteristics fully described in U.S. Patent No. 2,911,759.

In co-pending patent application No. 558,890 filed June 20, 1966, there is described and claimed a linear induction motor for controlling the movement of molten material by electro-magnetic induction. The motor embodies cooling arrangements and is cast in a block of refractory material so that it can be operated under the high temperature conditions which exist in glass manufacturing processes.

Dross may appear on the exposed surface of the bath of molten metal at the high temperature conditions referred to above, the existence of the dross being thought to be due to the presence of impurities, for example oxygen and/or sulphur, in the molten metal. Dross may also be present in small quantities on the molten metal bath as a result of the scavenging of impurities from the molten metal by the maintenance in the bath of molten metal of minute traces of elements with which the impurities in the molten metal react in preference to reaction with the molten metal.

It is a main object of the present invention to use electromagnetic induction to assist the collection and removal of dross from the bath of molten metal.

In a method of manufacturing flat glass according to the invention, during which glass in ribbon form is advanced down a central region of a bath of molten metal towards an outlet from the bath thereby exposing strips of the molten metal at each side of the glass ribbon, controlled surface flow of the exposed molten metal is induced electromagnetically into a region of the bath where dross carried by said directional surface flow is collected.

The region of the bath where dross is collected may take the form of a pocket of molten metal defined in the tank structure which contains a bath of molten metal. Such pockets of molten metal may be provided at any desired position along the bath and the induced surface flow of molten metal may be either in the same direction as the direction of advance of the ribbon of glass or in the opposite direction.

For example surface flow of molten metal may be induced from the outlet end of the bath into pockets of molten metal at each side of the bath a few feet away from the outlet end of the bath. Surface flow of the molten metal may be induced underneath the ribbon of glass as it is lifted off the bath surface for discharge through the outlet from the bath, in order to carry away dross from underneath the ribbon of glass as it is lifted off the molten metal surface, thereby minimising the possibility of dross being picked up on the underface of the ribbon of glass as it leaves the bath surface.

In a preferred method according to the invention, controlled surface flows of molten metal are induced down each side of the ribbon of glass towards the outlet end of the bath, and dross carried by said flows is collected in pockets of molten metal located in the region of the outlet end of the bath.

The invention also comprehends apparatus for use in the manufacture of flat glass in ribbon form, including an elongated tank structure containing a bath of molten metal, means for delivering glass at a controlled rate to the bath and advancing the glass in ribbon form along the bath towards an outlet for the glass from the bath, the tank structure being wider than the ribbon of glass at the level of the surface of the bath, wherein two linear induction motors are respectively mounted relative to the side walls of the tank structure over the exposed molten metal at the sides of the ribbon of glass and are operable to propel molten metal along the sides of the bath towards pockets of molten metal contained in recesses formed in the walls of the tank structure, in which recesses dross carried by the molten metal is collected.

In the preferred method according to the invention, dross is directed down the bath and then the surface flow of molten metal is diverted into pockets of molten metal in the region of the outlet end of the bath, and for carrying out this method the linear induction motors are mounted so as to propel molten metal down the sides of the bath towards the outlet end of the bath, oppositely disposed recesses are formed in the side walls of the tank structure in the region of the outlet end of the bath, and auxiliary linear induction motors are mounted above the inlets to the recesses so as to divert said surface flows of molten metal into the recesses.

Figure 2:
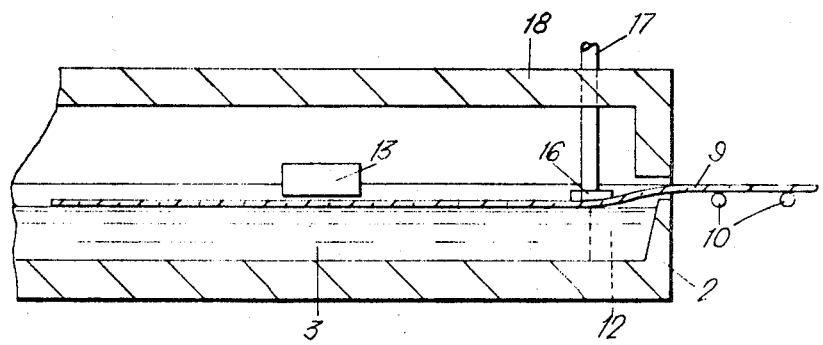

In order that the invention may be more clearly understood some embodiments thereof will now be described, by way of example, with reference to the accompanying drawings in which:

FIG. 1 is a plan view of a tank structure containing a bath of molten metal with the roof structure normally supported over the tank structure removed to show the location of linear induction motors, and FIG. 2 is a sectional elevation of the outlet end of the tank structure of FIG. 1 with the roof structure in position.

Referring to the drawings, there is illustrated in plan a tank structure of elongated form consisting of side walls 1 and end walls 2 and containing a bath of molten metal 3. A spout 4 extends over the end wall of the tank structure at the inlet end of the bath to deliver molten glass 5 on to the surface of the bath. The spout 4 extends from a forehearth of a glass melting furnace and the rate of flow of molten glass from the spout on to the bath surface is controlled by a tweel 6.

Molten glass 5 delivered to the bath is thermally regulated as it is advanced along the bath in order to establish a layer 7 of molten glass on the bath, which layer is permitted to flow laterally unhindered to the limit of its free flow under the influence of gravity and surface tension in order to develop on the surface of the bath a buoyant body 8 of molten glass which is then advanced in ribbon form along the bath and is gradually cooled as it is advanced by temperature regulators, not shown, in the bath 3 of molten metal and in the headspace over the bath until it is sufficiently stiffened to be taken as a ribbon 9 of glass from the bath through an outlet from the bath. The glass is conveyed through the outlet by conveyor rollers 10 mounted outside the outlet end wall of the tank structure.

A roof structure is supported over the tank structure to define a tunnel-shaped headspace over the bath, and the inlet for glass to the bath and the outlet from the bath are both restricted in height and are defined between end walls of the roof structure and the end walls 2 of the tank structure. The roof structure includes means for delivering a protective gas into the headspace over the bath and this protective gas is maintained at a pressure plenum in the headspace and protects the exposed parts of the surface of the molten metal against the formation of contaminants for the glass.

The width of the tank structure at the surface level of the bath is such that there are strips of the molten metal surface exposed at each side of the glass ribbon which is advanced down a central region of the bath. Despite the maintenance of the plenum of protective gas in the headspace over the bath, impurities, for example oxygen and/or sulphur, may enter the molten metal from the headspace or from the glass itself which is delivered to the bath. The presence of oxygen in the molten metal may result in the formation of solid particles of tin oxide which appear in the form of a fine dross on the exposed surface of the bath of molten metal. These impurities may be scavenged from the bath of molten metal by maintaining in the bath a trace of an additive element which is so chosen that the impurities in the molten metal react with the additive element in preference to reaction with the tin or other molten metal of the bath, and produce reaction products, for example oxides or sulphides, which may appear also in the form of a very fine dross on the exposed surface of the bath at the sides of the ribbon of glass.

Movement of molten metal from the hot end of the bath to the cooler end of the bath tends to carry any dross on the exposed surface of the molten metal down the bath towards the outlet end of the bath. The side walls of the tank structure are formed at the outlet end of the bath with recesses 11 which contain pockets 12 of the molten metal of the bath in which the dross moving down the sides of the bath is collected. The collected dross may be subsequently removed mechanically from the pockets.

The surface flow of the exposed molten metal is controlled according to the invention by employing electromagnetic induction to produce a directional surface flow of the surface metal which gives positive direction to the dross flow into the recesses where it is collected, while there is no interference with advancing of the ribbon of glass centrally down the bath of molten metal.

Near the outlet end of the bath where the temperature of the bath is in the region of 700° C. two linear induction motors 13 of the kind referred to above are mounted just above the level of the surface of the bath over the exposed strips of molten metal alongside the ribbon of glass. Each of the motors is fixed to the end of a cantilever beam 14 mounted in the respective tank side wall. As well as supporting the motor 13 and permitting adjustment of the gap between the motor and the surface of the bath, the beam 14 also carries the electrical connections to the motor from a multi-phase electrical source and pipes which supply an exhaust cooling fluid, for example water. In a preferred embodiment of the invention the linear induction motor is a three-phase motor.

The supply of current to the motor is so controlled that the effective field of the motor only extends down into a superficial layer of the molten metal over which the motor is supported. In this way a directional surface flow only of the molten metal is induced without interfering with the general disposition of the molten metal of the bath. This control can also be effected by controlling the height of the motor above the surface of the molten metal.

The controlled surface flows of molten metal induced by the two motors 13 down the sides of the bath of molten metal is indicated by the arrows 15 in FIG. 1 and these flows carry any dross on the exposed surfaces of the molten metal down each side of the ribbon of glass towards the outlet end of the bath. Auxiliary linear induction motors 16 are mounted above the inlets to the recesses 11 in order to divert the surface flows into the recesses so that the dross is carried on to the surfaces of the pockets 12 of molten metal contained in the recesses 11. Each of the auxiliary motors 16 is, as shown in FIG. 1, mounted at an angle to the side walls of the tank structure and has a similar construction to that of the main motors 13, but in this location it is more convenient for the inlet and exhaust water pipes as well as the electrical connections to the motor to be mounted in a conduit, indicated generally at 17 which is supported downwardly from the roof structure 18 over the bath.

In another arrangement according to the invention a linear motor is arranged just above the ribbon near the exit end of the bath in the region where the ribbon of glass is taken up off the bath surface. This linear motor is arranged so as to drive dross on the exposed surface of the bath, at the outlet end of the bath, forwardly against the outlet end wall 2 of the tank structure. On striking this rear wall the surface flow of molten metal carrying the dross is diverted laterally into the pockets 12 at each side of the bath, in which pockets the dross is collected.

Additional linear induction motors may be mounted over the exposed strips of the molten metal at the sides of the ribbon of glass to augment the action of the motors 13 so as to give a controlled surface flow of the molten metal right along the sides of the ribbon of glass, for example right from the hot end of the bath if desired. There may be more than one pocket of molten metal at each side of the bath, each pocket having a main linear induction motor directing a surface flow of molten metal towards the pocket together with an auxiliary linear induction motor if necessary to divert the dross-carrying surface flow into the pocket. Because the linear induction motors are cooled and are encased in a heat-resisting refractory material surface flow of molten metal can be induced electromagnetically right from the hot end of the bath without any effect on the magnetic properties of the material of the stator of the motor.

Another application of the invention is to the movement of dross from underneath the ribbon of glass as it is lifted up from the surface of the bath of molten metal for discharge through the outlet from the bath, a transverse surface flow of molten metal being induced electromagnetically in order to carry any dross from underneath the ribbon to the pockets where it is collected.

We claim:

1. A method of manufacturing flat glass during which glass in ribbon form is advanced down a central region of a bath of molten metal towards an outlet from the bath, thereby exposing strips of the molten metal surface at each side of the glass ribbon, comprising generating a moving electromagnetic field extending into the surface of said exposed strips of molten metal to induce electromagnetically surface flow of molten metal into a dross-collecting region of the bath, and regulating the strength of that field to confine said surface flow to a superficial layer only of said molten metal, whereby any surface dross is carried into said region without interfering with the general disposition of the molten metal of the bath.

2. A method according to claim 1, comprising inducing controlled surface flows of molten metal down each side of the ribbon of glass towards the outlet end of the bath, diverting said surface flows into pockets of molten metal located in the region of the outlet end of the bath, and collecting dross carried by said flows in said pockets.

3. Apparatus for use in the manufacture of flat glass in ribbon form, including an elongated tank structure containing a bath of molten metal, means for delivering glass at a controlled rate to the bath and advancing the glass in ribbon form along the bath towards an outlet for the glass from the bath, the tank structure being wider than the ribbon of glass at the level of the surface of the bath, two linear induction motors respectively mounted relative to the side walls of the tank structure over the exposed molten metal at the sides of the ribbon of glass, means for controlling the effective electromagnetic field of the motors extending down into a superficial layer of the molten metal to propel such layer of molten metal along the sides of the bath, and recesses formed in the walls of the tank structure containing pockets of molten metal toward which the superficial layer of molten metal is propelled, so that dross carried by the molten metal is collected in said recesses.

4. Apparatus according to claim 3, wherein said linear induction motors are mounted pointing downstream of the bath to propel molten metal down the sides of the bath towards the outlet end of the bath, said recesses are oppositely disposed in the side walls of the tank structure in the region of the outlet end of the bath, and at least one auxiliary linear induction motor is mounted at the outlet end of the bath and is angled outwards to divert said surface flows of molten metal into the recesses.

5. Apparatus according to claim 3 wherein the depth of the effective electromagnetic field into the superficial layer of molten metal is controlled by the supply of current to the motors.

6. Apparatus according to claim 3 wherein the depth of the effective electromagnetic field into the superficial layer of molten metal is controlled by the height of the motors above the surface of the molten metal.

References Cited

UNITED STATES PATENTS

| | | | |
|---|---|---|---|
| 1,872,467 | 8/1932 | Mambourg | 65—347 |
| 2,063,842 | 12/1936 | Honiss | 65—347 |
| 3,231,351 | 1/1966 | Brichard | 65—99 |
| 3,337,319 | 8/1967 | Edwards | 65—99 |
| 3,343,936 | 10/1967 | Silverwood et al. | 65—65 |

S. LEON BASHORE, Primary Examiner

R. V. FISHER, Assistant Examiner

U.S. Cl. X.R.

65—27, 65, 168, 182